Figure 1:
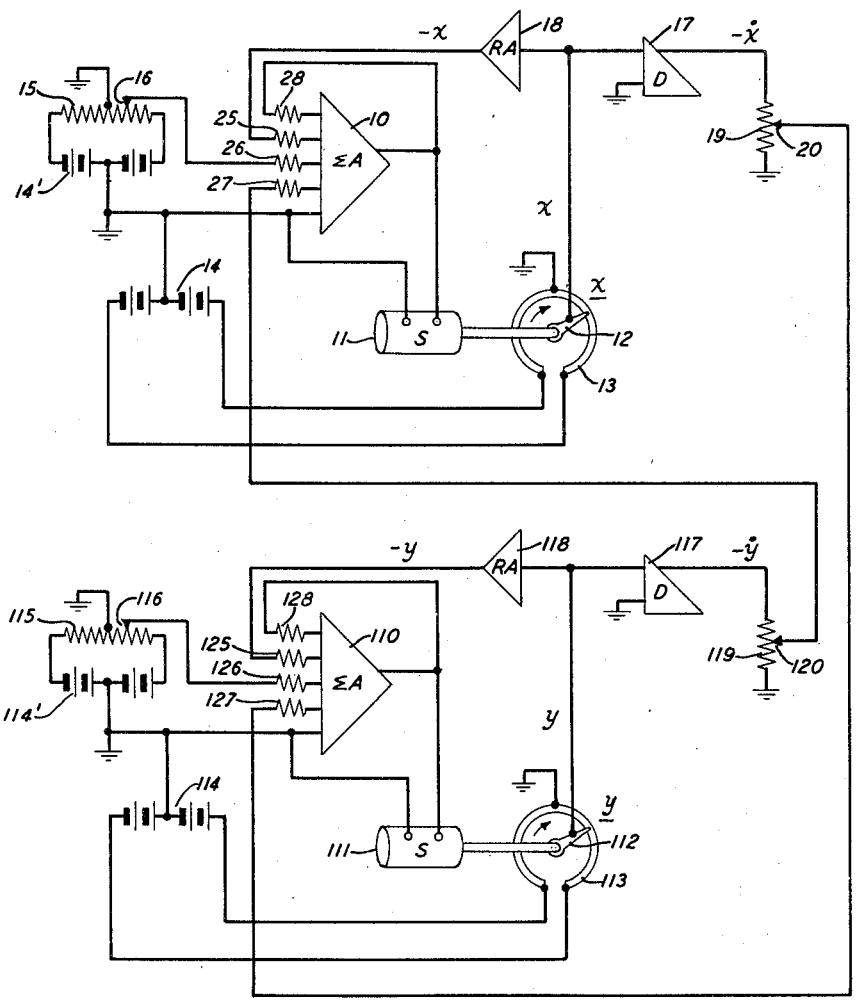

Patented Aug. 15, 1950

2,519,262

UNITED STATES PATENT OFFICE 2,519,262

DIFFERENTIAL ANALYZER

Clarence A. Lovell, Summit, N. J., assignor to Bell Telephone Laboratories, Incorporated, New York, N. Y., a corporation of New York Application September 9, 1948, Serial No. 48,358

6 Claims. (Cl. 235—61)

This invention relates to an improvement in electrical differential analyzers, making possible the solution, by electrical means in conjunction with servomotors, of simultaneous differential equations and of a differential equation in which the unknown quantity to be computed is complex and the terms of the equation include complex coefficients.

The present invention is an improvement over that of my copending application Serial No. 440,504, Electrical Computing System, filed April 25, 1942, now Patent No. 2,476,747. That application describes an electromechanical system for solving simultaneous linear algebraic equations and is assigned to the same assignee as the present invention.

It is the object of the invention herein disclosed to provide a system of apparatus for automatically solving simultaneous differential equations of any degree in $p$, where $p$ is the differential operator $$\frac{d}{dt}$$

The circuits shown in the figure are linear and of the first degree in $p$. Higher degrees in $p$ are solved through successive differentiation using differentiators of the type shown. Coefficients which are non-linear functions of the variables may be included through use of tapered potentiometers in place of the linear potentiometers shown.

The system of apparatus herein disclosed may with slight modification be adapted to the solution of a differential equation, of any degree in $p$, of a single complex variable when the coefficients and the constant term are themselves complex. Such an equation may be restated in the form of two simultaneous equations each involving the real and imaginary parts, and their time derivatives, of the unknown quantity and the like parts of the constant term and of the coefficients.

A further object of the invention is therefore to provide a system of apparatus for the automatic solution of a differential equation of the first degree in $p$, in which the unknown quantity, the coefficients and the constant term are complex.

The first time derivative of a variable V may be written either $$\frac{dV}{dt}$$

$pV$ or $\dot{V}$. In convenience, the third form will herein be used.

Electrical differentiators are used in the apparatus of the invention. These provide derivatives with respect to time, for which reason the independent variables must be a function of time or be transformed to be such in any well-known manner. The apparatus then furnishes continuous solutions of simultaneous differential equations in which the independent variable is a function of time, and to provide a novel apparatus for obtaining such continuous solutions is also an object of the invention.

In what follows, the variables involved in the equation to be solved will be considered, either inherently or by suitable transformation, functions of time.

The invention will be understood from the following description, referring to the accompanying drawings, in which:

Fig. 1 is a diagram of a circuit for the solution of two simultaneous equations of the form $$a_1x + b_1\dot{y} + c_1 = 0$$
$$a_2y + b_2\dot{x} + c_2 = 0$$

and

Figure 2:
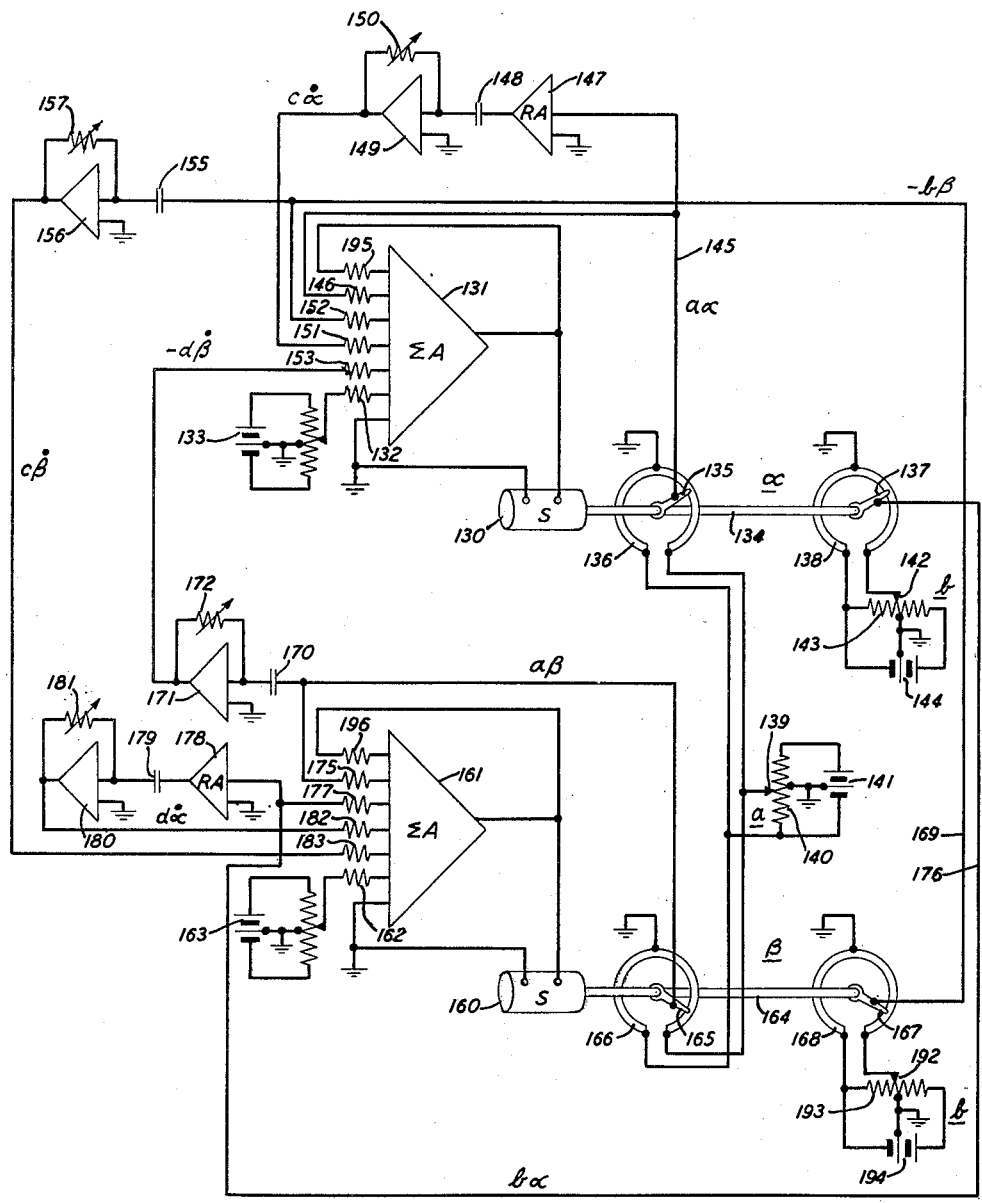

Fig. 2 is a diagram of a circuit for the solution of an equation of the form $$(a+jb)z + (c+jd)\dot{z} + (m+jn) = 0$$

where $z = \alpha + j\beta$.

In both figures, like numerals and letters indicate like elements.

It is convenient to mention the sources of various known devices which symbolically are shown in the figures of the drawings. Reversing amplifiers, identified by the symbol RA, are well known; they include each a thermionic vacuum tube in a conventional circuit of unit gain providing an output voltage equal but opposite in sign to an input voltage. Summing amplifiers, ΣA, are those disclosed by K. D. Swartzel, Jr., in United States Patent 2,401,779, June 11, 1946. Electrical differentiators, D, are the summing amplifiers of Swartzel so modified that the output voltage is the negative first time derivative of the sum of the input voltages; such modification is disclosed in United States Patent 2,412,227, December 10, 1946, to H. G. Och and K. D. Swartzel, Jr. Alternatively to the differentiators, D, there may be used the differentiating circuit shown in United States Patent 2,251,973, August 12, 1941, to E. S. L. Beale et al. Many types of servomotors, S, are known; direct-current servomotor circuits are shown, for example, in United States Patents 1,086,729, February 10, 1914, to J. A. Rey, and 1,268,712, June 4, 1918, to F. A. H. Harlé. P. A. Borden, in United States Patent 2,114,330, April 19, 1938, discloses the shaping of potentiometer cards to make the brush voltage any desired function of the brush displacement from a reference position.

Referring now to Fig. 1, it is convenient to write the equations to be solved in the equivalent forms $$x+\frac{b_1}{a_1}\dot{y}+\frac{c_1}{a_1}=0 \text{ and } y+\frac{b_2}{a_2}\dot{x}+\frac{c_2}{a_2}=0$$

In the circuit of Fig. 1, summing amplifier 10 controls servomotor 11, positioning brush 12 on potentiometer 13 which shunts battery 14, the mid-point thereof being grounded, ultimately deriving at brush 12 a voltage proportional to $x$. Similarly, summing amplifier 110 drives servomotor 111 to cause brush 112 ultimately to derive a voltage proportional to $y$ from potentiometer 113 shunting battery 114.

Batteries 14' and 114', of which the mid-points are grounded, are shunted, respectively, by potentiometers 15 and 115. The positive and negative voltages of battery 14' are chosen at least equal to the maximum numerical value of $$\frac{c_1}{a_1}$$

the voltages of battery 114' similarly correspond to the maximum numerical value of $$\frac{c_2}{a_2}$$

Voltages proportional to $$-\frac{c_1}{a_1} \text{ and to } -\frac{c_2}{a_2}$$

are selected, respectively, by handset taps 16 and 116.

The voltage at brush 12 is differentiated with respect to time by differentiator 17 to provide across potentiometer 19 the voltage $-\dot{x}$ when that at brush 12 is $x$. Similarly, through differentiator 117, the voltage $-\dot{y}$ is provided across potentiometer 119 when that at brush 112 is $y$. These time derivative voltages are fractionated, by handset taps 20 and 120, respectively, proportionally to $$\frac{b_2}{a_2} \text{ and } \frac{b_1}{a_1}$$

Reversing amplifiers 18 and 118 provide voltages numerically equal but opposite in sign to the voltages at brushes 12 and 112, respectively.

Writing $x'$ and $y'$ for the instantaneous values of voltage at brushes 12 and 112, respectively, one sees that the input voltages at amplifier 10 are: $-x'$ through resistor 25, $$-\frac{c_1}{a_1}$$

from tap 16 through resistor 26, and $$-\frac{b_1}{a_1}\dot{y}'$$

through resistor 27 from tap 120. To amplifier 110 the input voltages are: $-y'$ through resistor 125, $$-\frac{c_2}{a_2}$$

from tap 116 through resistor 126, and $$-\frac{b_2}{a_2}\dot{x}'$$

from tap 20 through resistor 127.

Servomotors 11 and 111 may be of the form shown by S. Darlington in United States Patent 2,438,112, March 23, 1948, assigned to the same assignee as the present invention. Summing amplifiers 10 and 110 are stabilized by reverse feedback through resistors 28 and 128, respectively.

Potentiometers 13, 15 and 113, 115 are grounded each at its mid-point, as are batteries 14, 14' and 114, 114'. Thus motors 11 and 111 are driven, when set in operation by suitable switches (not shown), to position their corresponding brushes 12 and 112 to either positive or negative voltages as may be required for the simultaneous adjustment to zero of the total input voltages, $$-x-\frac{b_1}{a_1}\dot{y}-\frac{c_1}{a_1}$$

to amplifier 10 and $$-y-\frac{b_2}{a_2}\dot{x}-\frac{c_2}{a_2}$$

to amplifier 110. When this adjustment is completed, the voltages at brushes 12 and 122 are respectively proportional to $x$ and $y$. Scales concentric with potentiometers 13 and 113 may be provided on which the computed values of $x$ and $y$ may be read.

Fig. 2 shows the circuit of Fig. 1 modified for the solution of the equation $(a+jb)\dot{z}+(c+jd)z+(m+jn)=0$ where $z=\alpha+j\beta$, and $\alpha$ and $\beta$ are to be found.

Expanding and separately collecting the real and the imaginary terms of the equation to be solved, we obtain two simultaneous equations in $\alpha$ and $\beta$ and their first time derivatives, thus transforming the single equation in a complex variable with complex coefficients and a complex constant term into two simultaneous equations in which the real and imaginary parts of the complex variable take the places of $x$ and $y$ in the circuit of Fig. 1. The two simultaneous equations so obtained are:

$$a\dot{\alpha}-b\dot{\beta}+c\alpha-d\beta+m=0$$

$$b\dot{\alpha}+a\dot{\beta}+d\alpha+c\beta+n=0$$

In Fig. 2, servomotor 130, controlled by the output of summing amplifier 131, operates to find $\alpha$, while servomotor 160 is controlled by summing amplifier 161 to find $\beta$. The constant terms $m$ and $n$ are introduced to the respective summing amplifiers 131 and 161 over resistors 132 and 162 from batteries 133 and 163, respectively. Motor 130 drives shaft 134 carrying brush 135 on potentiometer 136 and brush 137 on potentiometer 138, each of which potentiometers is grounded at its mid-point. Across potentiometer 136 is applied a voltage $a$, derived at handset tap 139 on potentiometer 140 shunting battery 141, while a voltage $b$ is applied across potentiometer 138 from handset tap 142 on potentiometer 143 shunting battery 144. Assuming, as is ultimately the case, that the angular positions of brushes 135 and 137 from the grounded mid-points represent $\alpha$, the voltage at brush 135 is $a\alpha$ and that at brush 137 is $b\alpha$.

Similarly, motor 160 drives shaft 164 ultimately to position brushes 165 and 167 at the angle $\beta$ from the grounded mid-points of potentiometers 166 and 168. To potentiometer 166 is supplied the voltage $a$ from tap 139; to potentiometer 168 the voltage $-b$ is applied from handset tap 192 on potentiometer 193 shunting battery 194. The voltages at brushes 165, 167 are then $a\beta$, $-b\beta$, respectively.

The voltage $a\alpha$ from brush 135 is passed on conductor 146 through resistor 149 to the input of amplifier 131; to the same input through reversing amplifier 147, condenser 148 and feedback amplifier 149, the voltage $c\alpha$ is passed through resistor 151. The adjustable feedback resistor 150 controls the gain of amplifier 149 and is set to provide the factor $c$. Through resistors 152 and 153, amplifier 131 receives the voltages $-b\beta$ on line 169 from brush 167, and $-d\beta$ from brush 165 through condenser 170 and amplifier 171 of which feedback resistor 172 is varied to provide the factor $d$.

The input voltages to amplifier 131 are then as follows:

| Voltage | Through Resistor |
|---|---|
| $a\alpha$ | 146 |
| $-b\beta$ | 152 |
| $c\alpha$ | 151 |
| $-d\beta$ | 153 |
| $m$ | 132 |

To summing amplifier 161, the voltage $a\beta$ is fed directly from brush 165 through resistor 175, and the voltage $b\alpha$ on conductor 176 from brush 137 is fed through resistor 177. The latter voltage is reversed by reversing amplifier 178 and passed through condenser 179 to amplifier 180 with adjustable feedback resistor 181. The output of amplifier 180 is the voltage $d\alpha$, reaching amplifier 161 through resistor 182. The remaining input voltage, $c\beta$, required for amplifier 161 is derived from the voltage $-b\beta$ on line 169 by differentiation and factor adjustment through condenser 155 and amplifier 156 with variable feedback resistor 157; this derivative voltage reaches amplifier 161 through resistor 183. The input voltages to amplifier 161 are then:

| Voltage | Through Resistor |
|---|---|
| $b\alpha$ | 177 |
| $a\beta$ | 175 |
| $d\alpha$ | 182 |
| $c\beta$ | 183 |
| $n$ | 162 |

Stabilizing feedback is provided through resistor 195 to amplifier 131 and through resistor 196 to amplifier 161.

The voltages controlling servomotors 130 and 160 are the negatives of the sums of the component input voltages to amplifiers 131 and 161, and the connections to motors 130 and 160 are made such that shafts 134 and 164 are driven to angular positions $\alpha$ and $\beta$ when the voltage sums are separately and simultaneously brought to zero, at least to within the small error corresponding to the motor power required to overcome brush and bearing friction. This error may be reduced substantially to zero by proper choice of motors, amplifier gains and potentiometer structures, a matter with which the present invention is not concerned. Scales to read the angular positions of shafts 134 and 164 may be provided to read $\alpha$ and $\beta$, respectively.

The coefficients $a$, $b$, $c$ and $d$ may, of course, be arranged by choice of the input resistors through which the corresponding voltages are fed to amplifiers 131 and 161; this is taught in the patent to Swartzel, 2,401,779, previously referred to. It is a matter of convenience, however, to keep equal and unchanged the amplifier input resistors, which are required to be large, and to establish the coefficients by such manipulation as has been described.

The apparatus arrangement for each of the illustrative problems solved by the circuits of Figs. 1 and 2 is easily made when the analog of a physical system is to be set up. In such a case it is known in which direction each of the variables controlled by the servomotors should change, in response to an error voltage from the corresponding summing amplifier, in order to reach the correct solution. The system is then inherently stable. In the unrestricted case, the stable arrangement of the apparatus is ascertainable, as may be seen from the following considerations:

A differential analyzer of the type of this invention involving $n$ servos and $n$ unknown variables may be connected in $2^n \cdot n!$ different ways. A servo may be connected so that a positive error voltage will cause the variable under control to increase or it may be connected so that the same error sign will cause the variable to decrease. This choice of two directions for each of $n$ servos gives $2^n$ poling combinations. Theoretically at least any one of the $n$ equations may be assigned the duty of controlling the servo which generates any one of the $n$ unknown variables. There are $n!$ distinct combinations of assignments of this sort, and the total number of connections is the product of these two factors, which in the problem described is eight. In general the assignments can be made more or less arbitrarily and a combination of polings can be found which causes all the error voltages to tend toward zero simultaneously. However, some assignments are superior to others because a faster convergence toward the solution results. The matter of speed of convergence is one best left to be considered for each system of equations when it is being set into the apparatus. These remarks apply particularly when the equations are of an abstract nature. The choice of the best assignment is easy when the apparatus is set up as an analog of an existing physical dynamic system since the analog will have the dynamic properties of the system simulated. The proper assignments are more or less automatic in this case.

The dynamic performance of the analyzer components may be made of little importance as they affect the over-all system stability, by making the actions of the servos fast compared with the changes in the functions being generated.

In cases where no physical guide to making the assignments and poling connections is apparent, the criteria for both lie in stabilizing the coupled system. The dynamical system of the analyzer is represented by a system of differential equations. An equation, called the "characteristic equation" of the matrix of such a system, is defined by E. J. Routh in "Stability of Motion," 1877, MacMillan & Co., London. Routh states a criterion for stability which is equivalent to: "The motion of a system of bodies is stable if the real roots and the real parts of the complex roots of the characteristic equation of the system are all negative." Routh's work applies to linear systems only. M. Liapounoff in "Probleme General de la Stabilite du Mouvement," Annales de Toulouse, vol. 9, 1907, discusses the non-linear case. He shows that in the neighborhood of a point the stability conditions for a non-linear system are described precisely by those of an associated linear system derived from the original system in a prescribed manner. Application of the tests of Routh and Liapounoff are laborious and should be used only in the difficult cases where no reliable physical guides for making the connections are apparent. Routh's and Liapounoff's results are found in classical mathematical treatises, for instance "Cours d' Analyse Mathematique," vol. 3, Edouard Goursat, Gauthier-Villars, Paris, 1915. It is to be noted that Routh and Liapounoff discuss in part systems found in nature and in part synthetic systems such as a governed steam engine. Hence, their results apply directly to the synthetic dynamic systems created by cross-coupling servo-systems in accordance with this invention. The tests show the conditions which are imposed on the properties of the servos and actually guide the user in making the connections. A more complete set of references is found in the 1946 edition of the Encyclopedia Britannica, under "Stability."

It should be noted that the solutions of a system of differential equations are in general variables, and as derived by this invention are variable functions of time. Some sort of recording device is required such as automatic plotters or means for photographing output dials at regular time intervals. Such devices are well known and hence are not shown as parts of the present invention.

The solutions of differential equations involve arbitrary constants. The number for each variable is equal to the order of the highest derivative of that variable which appears in any of the equations. There are, therefore, families of time functions for each variable rather than a single such function; the respective members of the families being distinguished from each other by having different values for the constants. These constants may be defined by the values the variable and its derivatives have initially, that is at the start of the solution when $t=0$. If one set of initial conditions are used one time function results, another set gives a different member of the family. A complete solution involves a reasonably complete representation of the entire family and hence it is desirable to be able to start with any required set of initial values. This, however, is not an essential part of the apparatus because it is always possible by a change of variables to replace any set of equations and associated initial conditions by an equivalent set in which all the initial values are zeros. The solutions of the original set can then be computed from the solutions of the new set through use of the transformation formulae used in changing the variables.

Thus the invention described in this disclosure can solve equations having any given set of associated initial conditions and it becomes unnecessary to show specific means for setting in initial values for the variables and their derivatives other than zeros. This means starting the system from a rest point where all the generated variables are zero.

For the sake of simplicity, the circuit of Fig. 1 has been shown and described as adapted to solve one of the simpler forms of simultaneous differential equations in two variables. The additional elements and connections required to provide a circuit for the solution of a larger plurality of simultaneous differential equations, in an equally larger number of variables with higher order derivatives and coefficients which are non-linear functions of certain of the variables, may readily be made and will be understood by one skilled in the art after reading the foregoing disclosure. It will be noted that each computing channel corresponds to a chosen equation and to a selected one of the variables to be computed and includes a servomotor controlling a variable voltage; the servomotor responds to an error voltage in the output circuit of a summing amplifier in the input circuit of which are algebraically combined voltages representing all of the terms of the chosen equation. The several servomotors operate contemporaneously to vary the voltages they respectively control until all the error voltages become zero, whereupon the variable voltages become individually proportional to the variables to be computed.

The automatic solution of a differential equation involving a single variable, in which the coefficients may be non-linear, is disclosed and claimed in the copending application of S. Darlington, filed September 10, 1947, Serial No. 775,287, now Patent No. 2,494,036, assigned to the same assignee as the present invention.

What is claimed is:

1. A system of apparatus for the solution of a plurality of simultaneous differential equations involving an equal plurality of variables, each equation including a known term, a term directly proportional to the one variable and its time derivatives and proportional to each of the other variables and their time derivatives, comprising a plurality of interconnected computing channels equal in number to the equations and corresponding individually thereto, each of said channels including a first and a second source of voltage, means for deriving from the first source a first voltage proportional to the known term of the corresponding equation, controllable means for deriving from the second source a variable voltage, means for fractionating the variable voltage proportionally to the term in each equation directly proportional to the one variable, means including electrical differentiators for deriving from the variable voltage differential voltages respectively proportional to the terms of each equation involving the time derivatives of the one variable, a summing amplifier having an input and an output circuit, servomotor means responsive to voltage in the output circuit to operate the controllable means and circuit means interconnecting the several channels for combining in the input circuits of the several amplifiers the voltages respectively proportional to the terms of the corresponding equations, thereby producing an error voltage in each of the output circuits which drives the servomotor thereto responsive so to operate the controllable means that the error voltage is reduced to zero and the variable voltage becomes proportional to the value of one of the variables satisfying the corresponding equation.

2. Means for the solution of a plurality of simultaneous differential equations involving a plurality of variables, each of said equations including a known term, terms proportional directly to functions of each of the variables and terms proportional to the time derivatives of involved orders of each of the variables, comprising a plurality of channels equal in number to the equations and corresponding each to one thereof, each of said channels including a source of voltage, means for deriving from the source a voltage proportional and opposite in sign to the known term of the corresponding equation, a second source of voltage, controllable means for deriving from the second source a variable voltage, means for successively differentiating the variable voltage with respect to time as indicated by the equation, a summing amplifier having an input and an output circuit and motor means driven from the output circuit to operate the controllable means; means in each channel for selecting from the variable voltages fractional voltages proportional to the terms in each equation involving the several variables and for selecting from the differential voltages fractional voltages proportional to the terms in each equation involving the time derivatives of the several variables; and interconnecting means for combining in the input circuit of each summing amplifier the voltage proportional to the known term of the corresponding equation together with the fractional voltages proportional to the terms thereof involving each of the variables and the fractional voltages proportional to the terms thereof involving the time derivatives of each of the variables, thereby enabling the several output circuits to cause the respective controllable means to make the variable voltages individually proportional to the solutions of the equations.

3. Means for the solution of a plurality of simultaneous differential equations in a plurality of variables comprising a plurality of channels each correspondent to a single one of the equations and to one of the variables and including a source of voltage proportional to a known term of the corresponding equation, a second source of voltage, means for deriving from the second source a variable voltage, means for deriving from the variable voltage fractional voltages proportional to the terms in each equation involving directly the corresponding variables, means for differentiating successively with respect to time the variable voltage to derive differential voltages of orders indicated by the equation and means for deriving from the differential voltages fractional voltages proportional to the terms in each equation involving these time derivatives of the one variable, interconnecting means for combining in each channel the voltages representing for the corresponding equation respectively the known terms, the terms involving directly each of the variables and the terms involving the various time derivatives of each of the variables, means in each channel responsive to the sum of the voltages combined therein and controlling the corresponding variable voltage deriving means to make the sum of the combined voltages of the several channels separately zero, thereby making the variable voltages individually proportional to the values of the variables constituting the solution desired.

4. In an apparatus for solving for a plurality of variables a plurality of simultaneous differential equations each including known terms and terms involving one or more of the variables and their time derivatives of any order, a plurality of interconnected computing channels individually corresponding to the equations; each of said channels including a first source of voltage and means for deriving therefrom voltages proportional to the known terms of the corresponding equation, a second source of voltage and means for deriving therefrom a variable voltage, computing means for deriving from the variable voltage voltages proportional to the terms of all the equations involving the variables and the time derivatives thereof, a summing amplifier having an input and an output circuit and motor means responsive to a voltage in the output circuit to control the second-named voltage deriving means; means interconnecting the several channels to combine in the input circuits of the respective amplifiers the voltages proportional to the terms of the respective corresponding equation, thereby producing error voltages in the output circuits of the amplifiers; and means for connecting the motor means in each channel to the output circuit of the amplifier therein to reduce the error voltages simultaneously to minimum values whereby the several variable voltages are made continuously proportional to the several solutions.

5. An apparatus for solving simultaneously a plurality of ordinary differential equations in a plurality of unknown variables in which the independent variable may be made proportional to time, comprising a plurality of electrical circuits, means for establishing therein quantities respectively proportional to the known terms of the equations, controllable means for establishing therein arbitrary quantities to represent the unknown variables, computing means including differentiators to perform the mathematical operations on the known and arbitrary quantities necessary to produce quantities respectively proportional to each term of the several equations, a plurality of means for combining said terms as indicated by the equations to produce a plurality of error voltages, means for causing each of the error voltages to control one of the arbitrary quantities in such a way that all the error voltages are reduced simultaneously to the minimum values required to actuate the controllable means, whereby the arbitrary quantities are caused to become and remain continuously the solutions of the set of equations.

6. Electrical apparatus for solving systems of differential equations comprising signal circuits and means for establishing therein signals corresponding to the known terms of the equations, means for generating initially arbitrary signals representing the unknown quantities in the equations, computing channels including electrical differentiators arranged to perform the mathematical operations which the equations indicate as to be performed on the known and the unknown quantities to produce the individual terms of the equations and including interconnecting means for feeding the known and the unknown terms into said computing channels, means for combining the terms as indicated by the equations to produce error signals, means for utilizing each error signal to modify the signal representing one of the unknown quantities in such a way that all said error signals are reduced to the minimum required to control the signal generating means, whereby the unknown quantities become the desired solutions.

CLARENCE A. LOVELL.

REFERENCES CITED

The following references are of record in the file of this patent:

UNITED STATES PATENTS

| Number | Name | Date |
|---|---|---|
| 2,454,549 | Brown et al. | Nov. 23, 1948 |
| 2,455,974 | Brown | Dec. 14, 1948 |
| 2,459,106 | Hardy et al. | Jan. 1, 1949 |